United States Patent [19]

Francis et al.

[11] Patent Number: 5,710,206

[45] Date of Patent: Jan. 20, 1998

[54] GELS COMPRISING BLOCK COPOLYMERS

[75] Inventors: Jane Valarie Francis, Ashton Keynes, England; Noel Marchel Michiel Overbergh, Corbielaan; Jan Lodewijk M. F. G. Vansant, Minneveld, both of Belgium

[73] Assignee: Raychem Limited, Swindon, United Kingdom

[21] Appl. No.: 609,956

[22] Filed: Mar. 4, 1996

Related U.S. Application Data

[63] Continuation of Ser. No. 304,431, filed as PCT/GB87/00506 Jul. 17, 1987, abandoned.

[30] Foreign Application Priority Data

Jul. 18, 1986 [GB] United Kingdom ............... 8617559

[51] Int. Cl.$^6$ ..................... C08L 53/02; C08K 5/06
[52] U.S. Cl. ................. 524/505; 524/490; 524/491; 524/502; 524/611; 524/876; 525/89; 525/92 D
[58] Field of Search ........................... 524/505, 490, 524/491, 611, 876, 502; 525/89, 92 D

[56] References Cited

U.S. PATENT DOCUMENTS

| | | | |
|---|---|---|---|
| 3,639,508 | 2/1972 | Kambour | 260/876 B |
| 4,123,410 | 10/1978 | Lee, Jr. | 260/30.6 R |
| 4,145,377 | 3/1979 | Bussink et al. | 260/876 B |
| 4,176,240 | 11/1979 | Sabia | 174/23 C |
| 4,313,864 | 2/1982 | Haaf et al. | 260/30.6 R |
| 4,361,508 | 11/1982 | Bourland | 523/173 |
| 4,423,176 | 12/1983 | Lee, Jr. | 524/153 |
| 4,716,183 | 12/1987 | Gamarra et al. | 522/80 |

FOREIGN PATENT DOCUMENTS

| | | | |
|---|---|---|---|
| 2021612 | 12/1979 | United Kingdom | C08L 1/00 |
| 1563768 | 4/1980 | United Kingdom | C08L 71/04 |
| 1591137 | 6/1981 | United Kingdom | C08L 71/04 |
| 2092176 | 8/1982 | United Kingdom | C10M 1/18 |

OTHER PUBLICATIONS

Patent Abstracts of Japan, vol. 10, No. 296 (C–377) (2352), 8 Oct. 1986, & JP, A, 61111354 (Asahi Chem Ind Co Ltd) 29 May 1986.

Yoshimura, D.K. and Richards, W.D.; "The Rheology of Triblock Copolymer/Homopolymer Blends," SPE 44th ANTEC, Boston, Apr. 28–May 1, 1986, pp. 688–691.

Galli, Ed; "Compatibilizers: Blending more perfect unions," Plastics Compounding Sep./Oct. 1986, pp. 20–23.

PCT Application WO 81/02120.

PCT Application WO 81/02610.

*Primary Examiner*—Vasu Jagannathan
*Assistant Examiner*—John J. Guarriello
*Attorney, Agent, or Firm*—Herbert G. Burkard; Yuan Chao

[57] ABSTRACT

A gel or gelloid composition contains (a) more than 50% by weight (based on total polymer content) of a block copolymer containing relatively hard blocks and relatively elastomeric blocks; (b) a polyphenylene ether; and (c) at least 500 parts by weight of an extender liquid per 100 parts by weight of the block copolymer, which liquid extends and softens the elastomeric blocks of the block copolymer. The polyphenylene ether is present in an amount sufficient to increase the softening or melting temperature of the gel or gelloid composition over that of the same composition without polyphenylene ether. The gel or gelloid composition is useful for sealing applications.

16 Claims, No Drawings

GELS COMPRISING BLOCK COPOLYMERS

This application is a continuation of application Ser. No. 07/304,431, filed as PCT/GB87/00506 Jul. 17, 1987, now abandoned, the disclosure of which is incorporated herein by reference.

This invention relates to a gel or gelloid composition, by which is meant a liquid-extended polymer composition having a cone penetration value (measured by a modified version of ASTM D217, as described below) within the range from 100 to 400, (preferably 100 to 350), ($10^{-1}$ millimeters); an ultimate elongation (measured by ASTM D412 as described below) greater than 100%, with substantially elastic deformation to an elongation of at least 100%; ultimate tensile strength (ASTM D412.) less than 1 MegaPascal; and dynamic storage modulus (as hereinafter described) less than 50000 Pascals. The composition may either contain a three-dimensional network of cross-linked molecular chains (gels) or may merely behave as if it contained such a network (gelloids).

The invention is more particularly concerned with gel or gelloid compositions mainly (more than 50%, preferably more than 90%, especially more than 95%, of the total polymer) comprising a block copolymer having relatively hard blocks and relatively elastomeric blocks (e.g. hydrogenated rubber blocks) examples of such copolymers including styrene-diene block copolymers (linear or radial) for example styrene-butadiene or styrene-isoprene diblock or triblock copolymers, or styrene-ethylene-butylene-styrene triblock copolymers.

Oil-extended compositions of block copolymers are known, for example from U.S. Pat. Nos. 3,676,387 (Lindlof), 3,827,999 (Crossland), 4,176,240 (Sabia), and 4,369,284 (Chen), and it has previously been found necessary to subject copolymer-oil adhesive compositions to radiation cross-linking in order to modify their physical and adhesive properties, as described for example in European Published Patent Application 0224389 (Raychem, Gamarra), U.S. Pat. Nos. 3,845,787 (Haefele) and 4,151,057 (St Clair) and in "Radiation Curing of PSA's Based on Thermoplastic Rubbers" by D. J. St.Clair, in *Adhesives Age*, March 1980, pages 30–36.

The present invention improves the characteristics of gel or gelloid compositions comprising block copolymers having the aforementioned hard blocks and elastomeric blocks without the need for crosslinking.

The invention accordingly provides a gel or gelloid liquid-extended polymer composition having (i) an ASTM D217 cone penetration value within the range from 100 to 400 ($10^{-1}$ millimeters), (ii) an ASTM D412 ultimate elongation greater than 100% with substantially elastic deformation to an elongation of at least 100%, (iii) an ASTM D412 ultimate tensile strength of less than 1 MegaPascal, and (iv) a dynamic storage modulus at 23° C. of less than 50000 Pascals; the composition comprising an intimate mixture of (a) mainly a block copolymer containing relatively hard blocks and relatively elastomeric blocks;

(b) additional polymer or copolymer material having at least partial compatibility with, and a higher glass transition, softening or melting temperature than, the hard blocks of the said block copolymer; and (c) at least 500 parts by weight of extender liquid per 100 parts by weight of the said block copolymer, which liquid extends and softens the elastomeric blocks of the said block copolymer.

Mixtures comprising 200 parts or less of the extender liquid, e.g. as in the hot melt adhesives described in U.S. Pat. Nos. 4,141,876 and 4,104,323, per 100 parts of block copolymer, generally do not behave as gel or gelloid compositions. Such mixtures tend to be too hard and to have too high an ultimate tensile strength and dynamic storage modulus, especially when tackifying resins are added.

Preferred gel or gelloid compositions according to the present invention have a cone penetration value within the range from 100 to 300 ($10^{-1}$ millimeters), and comprise preferably at least 1000, and preferably not more than 5000 parts by weight of the extender liquid per 100 parts by weight of the said block copolymer.

Despite such high levels of extender liquid, the compositions of this invention remain surprisingly stable, homogeneous, and free from phase separation and exudation of extender, and various properties are improved by the additional material while maintaining an adequate balance of other properties.

The extender liquid preferably has a boiling point higher than the softening or melting temperature of the mixture of the said block copolymer and the said additional polymer or copolymer, and the extender liquid is preferably mixed with the said block copolymer and the said additional polymer or copolymer at a temperature not less than the melting or softening temperature of the mixture of the said block copolymer and the said additional polymer or copolymer. Mastication or other mixing techniques at lower temperatures, perhaps with the aid of volatile solvents, may however be used if the resulting composition is acceptable for the intended end use.

An especially interesting class of block copolymer for the purposes of this invention are those wherein the hard blocks comprise polystyrene. The weight ratio of the hard blocks to the elastomeric blocks in those (and other) copolymers is preferably within the range from 0.25:1 to 0.75:1.

A preferred kind of additional polymers for styrene block copolymers are polyphenylene ethers (PPO), for example poly(2,6-dimethyl-1,4-phenylene) ether, which have substantially complete compatibility with the polystyrene blocks. Substantially complete compatibility of the additional polymer or copolymer material with the hard blocks of the block copolymer is preferable in all cases, and can usually be recognised by a substantial increase in the glass transition temperature of the hard blocks.

The requirement for the additional material to be at least partly compatible with the hard blocks does not, however, exclude cases where the additional polymer or copolymer material comprises a significant proportion of a polymer or copolymer which is not itself significantly compatible with the hard blocks of the said block copolymer, blended with at least one compatibilising material which renders the additional polymer material at least partially compatible with the said hard blocks. Preferred examples are blends or "alloys" of PPO with other polymers—for example polystyrene, which also has substantially complete compatibility with the hard blocks, although blends of PPO with other materials not substantially complete compatibility with hard block e.g., polyamides are also useful.

The additional polymer or copolymer material is preferably present in an amount sufficient to increase significantly, for example by at least 5° C., or even 10° C., the softening or melting temperature of the composition over that of the same composition without the said additional polymer or copolymer. It has been found useful to include 0.15 to 3, preferably 0.15 to 1.5, more preferably 0.15 to 1.2, parts by weight of the said additional polymer or copolymer material per part by weight of the hard blocks in the said block copolymer.

Although the present invention avoids the need for cross-linking, cross-linking of the composition may still be effected if desired, and may produce further improvements in properties. Cross-linking, however, tends to increase the hardness of the composition at room temperature, whereas the use of the additional polymer according to the present invention improves temperature performance without significantly increasing the hardness.

Within the specified range of properties for the gels and gelloids according to this invention, those having an ultimate elongation of at least 200% are preferred. Substantially elastic deformation up to an elongation of at least 200% is also preferred.

Among the block copolymers useful in the present invention are the hydrogenated styrene-diene block copolymers in which the styrene blocks have a molecular weight within the range from 2000 to 50000 and the diene blocks have a molecular weight within the range from 20000 to 300000. Preferred are those having at least two styrene end-blocks and at least one diene mid-block, the styrene end blocks comprising up to 55% by weight of the block copolymer. Examples include poly(styrene-ethylene-butylene-styrene) triblock copolymers, generally referred to as SEBS triblock copolymers. These copolymers have styrene end blocks and ethylene and butylene center blocks and are characterised by the ratio of styrene blocks to the combined ethylene-butylene blocks. Blends of two different SEBS triblock copolymers e.g. as described in European Published Patent Application 0224389 (Gamarra), the disclosure of which is incorporated herein by reference, provide oil extended elastomers according to this invention having certain desired cone penetration, elongation and tensile strength properties.

The extender liquids useful in the compositions of this invention comprising the block copolymer and additional polymer or copolymer as aforesaid may be selected from oils conventionally used to extend elastomeric materials. The oil may be a hydrocarbon oil such as paraffinic or naphthenic oils, synthetic oils such as polybutene or polypropene oils, and mixtures thereof. The preferred oils are mixtures of non-aromatic paraffins and naphthenic hydrocarbon oils. The oils should have a minimum boiling point higher than the softening point of the mixture of the block copolymer(s) and the additional polymer or copolymer. The ratio of polymer mixture to the oil will generally range from 2 to 30 parts polymer mixture to 70 to 98 parts oil. In general, it is preferred to use 3 to 10 parts of the block copolymer with 97 to 90 parts oil and most preferred for many applications to use from 4 to 8 parts of the block copolymer, with 96 to 92 parts oil.

The compositions of this invention are preferably prepared by mixing the oil with a blend of the block copolymer(s) and the additional polymer or copolymer material at a temperature not less than the glass transition temperature of the hard blocks of the said block copolymer in the blend, the glass transition temperature of the hard blocks having been raised by the blending. In order to achieve adequate mixing and for the polymers to melt fully and disperse in the oil, sufficiently high temperatures and sufficient mixing shear are preferably used. The mixing at the elevated temperature should be continued until the mixture is uniform and all of the polymers are evenly dispersed or blended in the oil. After sufficient mixing, the composition is then poured into the desired moulds or shapes and allowed to cool. The resulting elastomeric composition can be re-melted and again cooled without any significant change in physical properties.

The compositions of this invention can be made having a wide range of physical properties, such as cone penetration, ultimate elongation, and tear strength, desirable for particular end use applications. The preferred compositions having a cone penetration from about 100 to about 300 or 350 ($10^{-1}$ mm) (ASTM D217-82) and an ultimate elongation of at least 200% (ASTM D412) are particularly useful as sealing materials.

The styrene-diene block copolymers useful in the compositions of this invention include the SEBS triblock copolymers discussed above, poly(styrene-butadiene-styrene) block copolymers (SBS), poly (styrene-isoprene-styrene) block copolymers (SIS) and similar styrene-diene block copolymers known in the art. The SEBS block copolymers are preferred in some applications.

The oils useful in the radiation cross-linked versions of the composition of this invention can, for example, be the same oils as defined above.

The cross-linking agents useful in the electron beam radiation cross-linking of the block copolymer-oil composition, the amount of cross-linking agent, and the electron beam radiation dosage will depend on the composition, its configuration and the degree of cross-linking desired, and may be selected by the usual criteria, for example along the lines disclosed in the aforementioned European Published Patent Application 0224389.

It will be useful to use various additives for various purposes in any of the compositions of this invention. Such additives may be stabilisers, antioxidants, flame retardants, tackifiers, corrosion inhibitors and the like. It is useful to use antioxidants in all the compositions of this invention.

The compositions of this invention have numerous uses as elastomeric materials and in particular may be used as sealing materials, for example as illustrated in published European Patent applications 0108518 and 0191609, although the compositions of this invention will have many and varied uses depending on the properties desired and the temperatures to be encountered.

Gel or gelloid compositions within the scope of this invention are preferably defined by the following criteria (1) to (8) derived from Tests I to V described subsequently, of which preferably not more than one criterion (not (1) or (2)) will be outside the specified ranges.

I. Cone Penetration
(1) Cone Penetration value in the range 100–400 (1/10 mm).

II. Tensile Testing
(2) Ultimate Elongation greater than 100%.
(3) Ultimate Tensile Strength less than 1 MPa.

III. Dynamic Viscoelastic Properties (23° C.).
(4) Dynamic Storage Modulus, G', less than 50000 Pa at 1 Hz, preferably less than 5000 Pa, more preferably less than 1000 Pa at 1 Hz.
(5) Dynamic Mechanical Damping, Tan Delta, less than 1.00 at frequencies less than 5 Hz.

IV. Dynamic Viscoelastic Properties (80° C.)
(6) Dynamic Storage Modulus, G', greater than 10 Pa at 1 Hz.
(7) Dynamic Mechanical Damping, Tan Delta, less than 1.00 at frequencies less than 5 Hz.

V. Stress Relaxation
(8) Relaxation Time greater than 900 seconds.

Test I: Cone Penetration
Test method ASTM D217, for testing cone penetration in greases, is applied to the gel or gelloid compositions of the present invention (hereafter referred to as gels for simplicity), using a standard full-scale cone, to determine the penetration at 23° C. by releasing the cone assembly from a penetrometer and allowing the cone to drop freely into the gel for 5 seconds.

The gel sample is contained in a straight-sided circular cylindrical container which is filled to the brim with the gel. The height of the beaker is 72 mm and its internal diameter is 74 mm. The surface of the sample should be level and free from defects where possible. Air bubbles, especially close to the surface of the sample, should be avoided, and the surface should be protected from dust prior to testing.

Each measurement should be made close to the centre of the sample but not directly in the same place each time. Surface damage caused by the cone is generally clearly visible and must be avoided when making a subsequent measurement.

Test II: Tensile Testing

The method for the tensile testing of gels is a modified version of ASTM D412 in which tensile strength and ultimate elongation are measured at 23° C. on dumbbell shaped gel specimens that have not been prestressed. Ultimate elongation is measured by 'jaw separation' and tensile strength is based on the original cross sectional area of a uniform section of the specimen.

Tensile tests are performed on a power driven machine equipped to produce a uniform rate of grip separation of 50 mm/min for a distance of at least 1000 mm. The equipment should be capable of measuring the applied force to within 2% and of recording the resultant stress strain curve on a chart recorder. In the current work tensile stress strain measurements of the gel samples were made using an Instron floor model, TT-BM, fitted with a load cell capable of measuring to a lower limit full-scale deflection of 0.4 Newton. The load was indicated on a variable speed chart recorder to an accuracy of 0.5%.

Samples for tensile testing are cut from sheets of gel of uniform thickness between 1 and 6 mm using a Type 1 BS 2782/ISO 37 or a Type 3 ASTM D412 dumbbell cutter.

The gel specimens once cut may be difficult to handle. This may be improved by wrapping the ends of each specimen in lint-free tissue up to the distance where the sample will protrude from the machine jaws, (see below). This has also been observed to have the additional beneficial effect of restricting the flow of gel from within the grips themselves when the sample is tested, thereby improving the accuracy of the elongation measurement.

The tensile machine should first be calibrated in the normal way. Conventional air-grips may be used at an operating air pressure of approximately 20 psi. The dumbbell sample is placed in the jaws of the air-grips such that the jaws will hold predominantly onto the tissue covering the ends of the specimen rather than the gel itself. Some exudation of the gel from the far ends of the grips may be observed on closing the jaws. This will not prove to be a problem provided that exudation into the restricted section of the sample, between the two grips is minimal. The tissue wrap will help to minimise this in the case of very soft gels.

The sample is then tested to failure, which should ideally occur in the restricted section, at a cross-head speed of 50 mm/min and the stress-strain curve recorded on a chart recorder. A chart speed of 20 mm/min was found to be adequate for most samples.

The Ultimate Elongation of the sample may be obtained by calculating the cross-head movement from the chart recorder, (knowing the speeds of both). The elongation as a percentage of the original gauge length may then be determined.

For elongations less than the ultimate elongation, the sample will preferably undergo elastic deformation up to at least 100% (preferably at least 200%) as aforesaid, by which is meant that the stretched sample will "snap back" substantially to its original unstressed state if released substantially immediately from the elongating tension.

Tests III, IV and V: Dynamic Viscoelastic Properties & Stress Relaxation

Characterisation of the intrinsic viscoelastic properties of gel materials may be preformed using a dynamic spectrometer.

Dynamic mechanical behaviour, in oscillating shear stress and strain conditions, makes it possible to calculate a storage modulus, G', (orG(T), the relaxation torque modulus in the case of stress relaxation), and a quantity responsible for the dissipation of energy as heat, G". The complex dynamic viscosity, Eta*, may also be used to describe the 'viscous' characteristics of the mechanical behaviour when viscoelastic materials such as gels are deformed; part of the energy being stored as potential energy and part being dissipated as heat. The ratio of energy lost to energy stored in the system manifests itself as mechanical damping, Tan Delta. Such behaviour will vary over a time, temperature and frequency spectrum but may be used to predict the overall performance of a gel, especially with regard to structural effects resulting from molecular transitions, crystallisation, crosslinking, phase separation etc.

The storage aid loss moduli, G' and G" respectively, together with the complex dynamic viscosity, Eta*, and mechanical damping, Tan Delta, are measured at 23° and 80° C. on 25 mm diameter disc specimens as a function of frequency. Similar specimens are used in the measurement of the elastic torque modulus, G(T), as a function of time at 23° C. in stress relaxation.

Dynamic mechanical measurements on gels are performed on a suitable dynamic spectrometer such as a Rheometrics machine. In the current work a Rheometrics RDS-7700 has been used. The RDS-7700 is primarily a dynamic mechanical instrument for characterising the viscous and elastic behaviour of fluids and solids over an angular frequency of 0.1 to 100 rad/sec. and a temperature range of −150 to 400 C. The main operating mode of the RDS is sinusoidal shear oscillation over four decades of amplitude. Steady shear rheological measurement over a shear rate range of 0.01 to 10,000 reciprocal seconds may also be performed. The viscoelastic response of materials to deformation is monitored by a precision air-bearing transducer enabling maximum torque sensitivity coupled with high stability and resonant frequency. Instrument control, data aquisition and analysis are preformed by a DEC 11/23 Minc computer system.

Samples for dynamic mechanical testing are cut from sheets of gel of uniform thickness between 1 and 5 mm using a 25 mm diameter circular razor cutter. The samples are cleaned with lint-free wipes before testing in order to remove any unwanted surface deposits and surplus extender.

Procedure a) Frequency Sweeps

The dynamic mechanical properties of gels are measured using the oscillatory parallel plate mode at 23° and 80° C. over an angular frequency range of 0.1 to 100 reciprocal seconds. Dynamic strain is generally maintained at 0.05 except for measurements at low rates and high temperatures in which cases larger deformations may be necessary to improve instrument signal resolution.

b) Stress Relaxation

Stress relaxation experiments are performed using the transient parallel plate mode, allowing the imput of a preselected step strain level up to 100%. The decay of the resultant torque modulus and normal stress are measured as a function of time at constant temperature.

Specific examples of the preparation of compositions according to this invention will now be described.

Solution blends of the two polymers, Kraton G1651 (Shell) and poly (2,6-dimethyl-1,4-phenylene) ether (PPO) from Aldrich Chemical Co. were made by the following method. The required amount of each polymer was dissolved in chloroform, at approximately 5% w/v concentration, mixing the solutions and precipitating the blend by pouring with stirring into a tenfold excess of methanol. The precipitated blends were filtered and dried overnight at 60° C. under vacuum.

Gels were made from the above blends. The components were weighed into a reaction vessel fitted with a mechanical stirrer, a thermometer and a nitrogen bleed. The mixing was carried out under nitrogen to minimise any risk of oxidation of the polymer but would not be necessary with higher shear mixing at lower temperatures. The components were heated with stirring to between 150°–200° C., depending on the polymer blend used, until homogenous. The gel could then be poured into suitable receptacles where, it solidified on cooling, and was subjected to the tests indicated below. G' and Tan Delta being determined at 23° C., 1 Hz. All samples had cone penetration and ultimate elongation within the acceptable ranges mentioned above. Softening points were determined by Thermomechanical Analysis (TMA) using the point of intersection of a line extrapolated from the pre-softening part of the graph with a line extrapolated from the softening slope part of the graph.

All gels contained:

|  | parts |
|---|---|
| Kraton G1651 | 100 |
| White mineral oil* | 2000 |
| Antioxidant (Irganox 1010) | 20 |

*From Fisons Laboratory Supplies (substantially zero aromatics)

while the PPO content varied:

| Gel Example | Parts PPO |
|---|---|
| 1 (control) | 0 |
| 2 | 10 |
| 3 | 20 |
| 4 | 40 |
| 5 | 80 |

Results

| Example | 1 | 2 | 3 | 4 | 5 |
|---|---|---|---|---|---|
| TMA softening pt. °C. | 98 | 101 | 117 | 126 | 114 |
| G' at 23° C., 1 Hz (kPa) | 0.68 | 0.52 | 0.56 | 0.50 | 0.61 |
| tan Delta at 23° c., 1 Hz | 0.18 | 0.14 | 0.19 | 0.24 | 0.21 |

Similarly, a second series of gels were made and tested each containing:

|  | parts |
|---|---|
| Kraton G1651 | 100 |
| Edelex 45* | 2000 |
| Antioxidant | 20 |

*Shell process oil (5% aromatics)

and varying the PPO content:

| Gel Example | parts PPO |
|---|---|
| 6 (control) | 0 |
| 7 | 20 |
| 8 | 40 |
| 9 | 60 |
| 10 | 80 |

Results

| Example | 6 | 7 | 8 | 9 | 10 |
|---|---|---|---|---|---|
| TMA softening pt. °C. | 68 | 102 | 109 | 115 | 116 |
| G' at 23° C., 1 Hz (kPa) | 1.28 | 0.98 | 1.2 | 1.2 | 1.26 |
| tan Delta at 23° c., 1 Hz | 0.19 | 0.25 | 0.24 | 0.2 | 0.23 |

Further examples were prepared by procedures similar to those described above, using in each case 100 parts by weight of the Kraton G1651 block copolymer and 2000 parts by weight of FINA A400 B extender oil which is a pharmaceutical grade white mineral oil substantially free from aromatic components, and the same antioxidant as described for the preceding examples.

Different PPO molecular weights are illustrated as follows:

|  | parts |
|---|---|
| Kraton G1651 | 100 |
| FINA A400 B | 2000 |
| Antioxidant | 20 |

| Gel Example | Parts PPO | PPO Mw |
|---|---|---|
| 11 | 0 | — |
| 12 | 20 | 18,000 |
| 13 | 20 | 35,000 |
| 14 | 20 | 44,000 |
| 15 | 20 | 47,000 |
| 16 | 20 | 56,000 |
| 17 | 20 | 59,000 |
| 18 | 20 | 81,000 |

Results

| Example | 11 | 12 | 13 | 14 | 15 | 16 | 17 | 18 |
|---|---|---|---|---|---|---|---|---|
| TMA softening pt. °C. | 103 | 109 | 117 | 118 | 113 | 107 | 111 | 113 |
| G' at 23° C., 1 Hz (kPa) | 1.09 | 1.03 | 0.84 | 0.77 | 0.78 | 0.78 | 0.54 | 0.68 |
| Tensile strength (kPa) | 71 | 16 | 5 | 5 | 5 | 5 | 3 | 5 |
| Elongation (%) | 988 | 466 | 401 | 459 | 342 | 451 | 306 | 375 |

Low levels of PPO (M.W. 18000) are illustrated as follows:

|  | parts |
|---|---|
| Kraton G1651 | 100 |
| FINA A400 B | 2000 |
| Antioxidant | 2 |

|  | parts |
|---|---|
| Kraton G1651 | 100 |
| FINA A400 B | 2000 |
| Antioxidant | 2 |

| Gel Example | Parts PPO |
|---|---|
| 19 | 1 |
| 20 | 2 |
| 21 | 4 |
| 22 | 6 |
| 23 | 8 |
| 24 | 10 |

Results

| Example | 19 | 20 | 21 | 22 | 23 | 24 |
|---|---|---|---|---|---|---|
| TMA softening pt. °C. | 105 | 105 | 108 | 113 | 112 | 113 |
| G' at 23° C., 1 Hz (kPa) | 0.96 | 0.96 | 0.88 | 0.86 | 0.84 | 0.96 |
| Tensile strength (kPa) | 15 | 21 | 24 | 15 | 13 | 10 |
| Elongation (%) | 619 | 583 | 667 | 536 | 501 | 390 |

Different additives are illustrated as follows, using various polymer "alloys" as the said additional polymer or copolymer material:

|  | parts |
|---|---|
| Kraton G1651 | 100 |
| FINA A400 B | 2000 |
| Additive | 20 |
| Antioxidant | 2 |

| Gel Example | Additive (*Trade Mark) |  |
|---|---|---|
| 25 | Noryl* 110 | PPO/Polystyrene "alloy" from G.E. |
| 26 | Noryl* 731 | PPO/Polystyrene "alloy" from G.E. |
| 27 | Noryl* EN 130 | PPO/Polystyrene "alloy" from G.E. |
| 28 | Prevex* BJA | PPO/Polystyrene "alloy" from Borg-Warner |
| 29 | Prevex* VQA | PPO/Polystyrene "alloy" from Borg-Warner |
| 30 | Luranyl* KR 2401 | PPO/High Impact Polystyrene "alloy" from BASF |
| 31 | Dylark* | Styrene/Maleic anhydride copolymer from BASF |

Results

| Example | 25 | 26 | 27 | 28 | 29 | 30 | 31 |
|---|---|---|---|---|---|---|---|
| TMA softening pt. °C. | 113 | 112 | 110 | 112 | 113 | 112 | 107 |
| G' at 23° C., 1 Hz (kPa) | 0.83 | 0.84 | 0.88 | 0.81 | 0.77 | 0.79 | 0.87 |
| Tensile strength (kPa) | — | — | — | — | — | 8 | 20 |
| Elongation (%) | — | — | — | — | — | 447 | 672 |

The addition of the said polymer or copolymer material comprising Noryl 110 "alloy" in various amounts is illustrated as follows:

|  | parts |
|---|---|
| Kraton G1651 | 100 |
| FINA A400 B | 2000 |
| Antioxidant | 20 |

| Gel Example | Parts Noryl 110 |
|---|---|
| 32 | 1 |
| 33 | 2 |
| 34 | 4 |
| 35 | 6 |
| 36 | 8 |
| 37 | 10 |
| 38 | 20 |
| 39 | 40 |
| 40 | 60 |
| 41 | 80 |
| 42 | 100 |

Results

| Example | 32 | 33 | 34 | 35 | 36 | 37 | 38 | 39 | 40 | 41 | 42 |
|---|---|---|---|---|---|---|---|---|---|---|---|
| TMA softening pt. °C. | 101 | 110 | 108 | 110 | 107 | 112 | 113 | 112 | 112 | 115 | 113 |
| G' at 23° C., 1 Hz (kPa) | 0.96 | 0.85 | 0.92 | 0.97 | 0.96 | 0.91 | 0.83 | 0.79 | 0.86 | 0.87 | 1.04 |
| Tensile strength (kPa) | 49 | 19 | 20 | 13 | 12 |  |  |  |  |  |  |
| Elongation (%) | 914 | 558 | 651 | 596 | 567 |  |  |  |  |  |  |

From the preceding examples it can be seen that the additional polymer or copolymer material can be used to restore the softening temperature of gels wherein the extender liquid includes aromatic components, which tend to soften the hard blocks. (Examples 6 to 10). When the extender liquid has less than 5%, preferably less than 2%, and especially when it is substantially free from, aromatic components, the additional polymer, copolymer or polymer alloy material can still contribute useful improvement in softening temperature which may enable a gel to meet performance requirements which would require crosslinking in the absence of the additional material. The additional material may also improve the resistance to compression set in the presence of aromatic extender liquid components, and tends to reduce the storage modulus.

We claim:

1. A gel or gelloid liquid-extended polymer composition having (i) an ASTM D217 cone penetration value within the range from 100 to 400 ($10^{-1}$ millimeters), (ii) an ASTM D412 ultimate elongation greater than 100% with substantially elastic deformation to an elongation of at least 100%, (iii) an ASTM D412 ultimate tensile strength of less than 10 MegaPascal, and (iv) a dynamic storage modulus at 23° C. of less than 50000 Pascals; the composition comprising an intimate mixture of:

(a) more than 50% by weight (based on total polymer content) of a block copolymer containing relatively hard blocks and relatively elastomeric blocks;
  (b) additional polymer or copolymer material which is a polyphenylene ether; and
  (c) at least 500 parts by weight of extender liquid per 100 parts by weight of the said block copolymer, which liquid extends and softens the elastomeric blocks of the said block copolymer wherein the amount of the said additional polymer or block copolymer material is sufficient to increase the softening or melting temperature of the composition over that of the same composition without the said additional polymer or copolymer material.

2. A composition according to claim 1 having an ASTM D217 cone penetration value within the range from 100 to 300 ($10^{-1}$ millimeter).

3. A composition according to claim 1, wherein the boiling point of the extender liquid is higher than the softening or melting temperature of a mixture of the said block copolymer and the said additional polymer or copolymer material.

4. A composition according to claim 3, wherein the extender liquid has been mixed with the said block copolymer and the said additional polymer or copolymer material at a temperature not less than the melting or softening temperature of the mixture of the said block copolymer and the said additional polymer or copolymer material.

5. A composition according to claim 4, wherein the block copolymer and the additional polymer or copolymer material have been blended together before mixing with the extender liquid.

6. A composition according to claim 1, wherein the elastomeric blocks of the said block copolymer comprise hydrogenated rubber.

7. A composition according to claim 1, wherein the hard blocks of the said block copolymer comprise polystyrene.

8. A composition according to claim 1, wherein the additional polymer or copolymer material comprises a significant proportion of a polymer or copolymer which is not itself significantly compatible with the hard blocks of the said block copolymer, together with at least one compatibilising material which renders the additional polymer material substantially compatible with the said hard blocks.

9. A composition according to claim 1, 6 or 7, wherein the weight ratio of the hard blocks to the elastomeric blocks in the said block copolymer is within the range from 0.25:1 to 0.75:1.

10. A composition according to claim 1, comprising from 0.15 to 3, preferably 0.15 to 1.2, parts by weight of the said additional polymer or copolymer material per part by weight of the hard blocks in the said block copolymer.

11. A composition according to claim 1, having an ultimate elongation of at least 200%.

12. A composition according to claim 1 or 7, wherein the extender liquid has less than 2% aromatics content.

13. A method of manufacturing a gel composition according to claim 1, comprising mixing the extender liquid with a blend of the said block copolymer and the said additional polymer or copolymer material at a temperature not less than the glass transition temperature of the hard blocks of the said block copolymer in the blend.

14. A composition according to claim 1, wherein the said additional polymer or copolymer material is poly(2,6-dimethyl-1,4-phenylene)ether.

15. A composition according to claim 14, wherein the elastomeric blocks of the said block copolymer comprise hydrogenated rubber.

16. A composition according to claim 14, wherein the hard blocks of the said block copolymer comprise polystyrene.

\* \* \* \* \*